United States Patent
Hosomi et al.

(10) Patent No.: US 10,906,113 B2
(45) Date of Patent: Feb. 2, 2021

(54) ARC WELDING METHOD FOR HOT-DIP GALVANIZED STEEL PLATE HAVING EXCELLENT APPEARANCE OF WELDED PART AND HIGH WELDING STRENGTH, METHOD FOR MANUFACTURING WELDING MEMBER, AND WELDING MEMBER

(71) Applicant: Nisshin Steel Co., Ltd., Tokyo (JP)

(72) Inventors: Kazuaki Hosomi, Tokyo (JP);
Tomokazu Nobutoki, Tokyo (JP);
Takefumi Nakako, Tokyo (JP)

(73) Assignee: Nisshin Steel Co., Ltd., Tokyo (JP)

( * ) Notice: Subject to any disclaimer, the term of this patent is extended or adjusted under 35 U.S.C. 154(b) by 317 days.

(21) Appl. No.: 15/577,474

(22) PCT Filed: Feb. 2, 2016

(86) PCT No.: PCT/JP2016/053048
§ 371 (c)(1),
(2) Date: Nov. 28, 2017

(87) PCT Pub. No.: WO2016/194400
PCT Pub. Date: Dec. 8, 2016

(65) Prior Publication Data
US 2018/0354049 A1 Dec. 13, 2018

(30) Foreign Application Priority Data

May 29, 2015 (JP) .................................. 2015-109292
Aug. 4, 2015 (JP) .................................. 2015-154570

(51) Int. Cl.
*B23K 9/09* (2006.01)
*B23K 9/23* (2006.01)
(Continued)

(52) U.S. Cl.
CPC ................. *B23K 9/093* (2013.01); *B23K 9/09* (2013.01); *B23K 9/173* (2013.01); *B23K 9/23* (2013.01);
(Continued)

(58) Field of Classification Search
CPC .......... B23K 9/093; B23K 9/173; B23K 9/09; B23K 9/23; B23K 2101/34;
(Continued)

(56) References Cited

U.S. PATENT DOCUMENTS 10,590,974 B2 * 3/2020 Shiozaki ................ B23K 9/025
10,654,121 B2 * 5/2020 Fujiwara ................ B23K 9/095
(Continued)

FOREIGN PATENT DOCUMENTS

| | | |
|---|---|---|
| CN | 104159700 A | 11/2014 |
| EP | 2 862 662 A1 | 4/2015 |

(Continued)

OTHER PUBLICATIONS

International Search Report issued in corresponding PCT/JP2016/053048 dated Apr. 26, 2016.
(Continued)

*Primary Examiner* — Patrick M. Buechner
*Assistant Examiner* — Randall S Gruby
(74) *Attorney, Agent, or Firm* — Mintz Levin Cohn Ferris Glovsky and Popeo, P.C.; David G. Conlin; Joohee Lee

(57) ABSTRACT

Hot dip Zn-based alloy coated steel sheets (1, 1') are arc-weld in such a way that (a) a current waveform is a pulsed current waveform in which (i) a peak current and a base current alternate with each other at a pulse period of 1 ms to 50 ms and (ii) an average welding current is 100 A to 350 A and (b) an average welding voltage is 20 V to 35 V. Each of the hot dip Zn-based alloy coated steel sheets (1, 1') includes a coating layer that contains Zn as a main compo-
(Continued)

nent and that contains Al at a concentration of 1.0% by mass to 22.0% by mass, and has a coating weight W of 15 g/m² to 250 g/m².

4 Claims, 4 Drawing Sheets

(51) Int. Cl.

| | | |
|---|---|---|
| *C22C 18/04* | (2006.01) | |
| *C22C 18/00* | (2006.01) | |
| *B23K 9/173* | (2006.01) | |
| *B32B 15/01* | (2006.01) | |
| *B23K 101/18* | (2006.01) | |
| *B23K 101/34* | (2006.01) | |

(52) U.S. Cl.
CPC ............ *B32B 15/013* (2013.01); *C22C 18/00* (2013.01); *C22C 18/04* (2013.01); *B23K 2101/18* (2018.08); *B23K 2101/34* (2018.08)

(58) Field of Classification Search
CPC ..... B23K 2101/18; C22C 18/00; C22C 18/04; B32B 15/013; C23C 2/40; C23C 2/06
See application file for complete search history.

(56) References Cited

U.S. PATENT DOCUMENTS

| | | | | |
|---|---|---|---|---|
| 2008/0206593 A1* | 8/2008 | Fukuda | ................ | B23K 9/173 428/653 |
| 2008/0206594 A1* | 8/2008 | Fukuda | ................ | B23K 9/173 428/653 |
| 2009/0017328 A1 | 1/2009 | Katoh et al. | | |
| 2009/0158889 A1* | 6/2009 | Kodama | ............ | B23K 35/3086 75/302 |
| 2009/0230108 A1* | 9/2009 | Nakahara | ................ | B23K 9/091 219/137 PS |
| 2011/0253691 A1 | 10/2011 | Kodama et al. | | |
| 2011/0318606 A1* | 12/2011 | Fujimoto | .............. | B32B 15/013 428/659 |
| 2012/0152928 A1 | 6/2012 | Schmid | | |
| 2013/0235585 A1 | 9/2013 | Kim et al. | | |
| 2013/0337287 A1* | 12/2013 | Hirata | ..................... | C22C 38/02 428/659 |
| 2015/0027995 A1 | 1/2015 | Izutani et al. | | |
| 2015/0136741 A1* | 5/2015 | Hosomi | ................ | B23K 9/173 219/74 |
| 2015/0231726 A1* | 8/2015 | Hosomi | ................ | B23K 9/164 219/74 |
| 2016/0008906 A1* | 1/2016 | Zeniya | ............... | B23K 35/3053 403/271 |
| 2017/0274479 A1 | 9/2017 | Katoh et al. | | |
| 2017/0326672 A1* | 11/2017 | Nobutoki | ................. | B23K 9/02 |

FOREIGN PATENT DOCUMENTS

| | | |
|---|---|---|
| JP | 05-329682 | 12/1993 |
| JP | 07-232294 | 9/1995 |
| JP | 09-206984 | 8/1997 |
| JP | 10-258367 | 9/1998 |
| JP | 2006-249521 A | 9/2006 |
| JP | 2013-035060 A | 2/2013 |
| JP | 2013-187197 A | 9/2013 |
| JP | 2013-198935 A | 10/2013 |
| JP | 2014-131809 A | 7/2014 |
| JP | 2014-133259 A | 7/2014 |
| KR | 2008/0087034 A | 9/2008 |
| RU | 2410221 C2 | 1/2011 |
| RU | 2548356 C2 | 4/2015 |
| WO | 03/057940 A1 | 7/2003 |
| WO | 2010/073763 A1 | 7/2010 |

OTHER PUBLICATIONS

English Translation of International Preliminary Report on Patentability issued in corresponding PCT/JP2016/053048 dated Apr. 26, 2016.
Third Party Observation for corresponding PCT/JP2016/053048 dated Sep. 8, 2017.
Decision of Refusal dated Nov. 1, 2016 in corresponding JP 2015-154570.
Notification of Reasons for Refusal dated Sep. 13, 2016 in corresponding JP 2015-154570.
Extended European Search Report dated Sep. 24, 2018 in corresponding European Patent Application No. 16802839.7.
Notification of the First Office Action (National phase of PCT application), dated Sep. 25, 2018, in corresponding Chinese Application No. 2016800311987 (with English language translation).
Office Action for Indian Patent Application No. 201747043946, dated Aug. 31, 2020, 6 pages.
Quintino, L. et al., "Pulsed GMAW:interactions between process parameters—Part 1" Focus on Research, Mar. 1984 original file name: D7-Quintino WMF 1984.
Gosh, P.K. et al., "Pulsed Current Gas Metal Arc Welding under Different Shielding and Pulse Parameters; Part 1: Arc Characteristics" ISIJ International, vol. 49, No. 2, 2009.
Notice of Opposition dated Oct. 29, 2020 for European Application No. 16802839.7.

* cited by examiner

ARC WELDING METHOD FOR HOT-DIP GALVANIZED STEEL PLATE HAVING EXCELLENT APPEARANCE OF WELDED PART AND HIGH WELDING STRENGTH, METHOD FOR MANUFACTURING WELDING MEMBER, AND WELDING MEMBER

CROSS REFERENCE TO RELATED APPLICATION

The present application is a National Stage Entry of the International Patent Application No. PCT/JP2016/053048 filed Feb. 2, 2016, which also claims the benefit of priority of the Japanese Patent Application No. 2015-154570 filed Aug. 4, 2015 and Japanese Patent Application No. 2015-109292 filed May 29, 2015. The entire contents of those applications are incorporated herein for all purposes by this reference.

TECHNICAL FIELD

The present invention relates to a method of arc-welding hot dip Zn-based alloy coated steel sheets, which method hardly causes a spatter and a blowhole so that a welded part is excellent in appearance and strength. Further, the present invention relates to a welded member, which has a welded part that is excellent in appearance and strength, and a method of producing such a welded member.

BACKGROUND ART

A hot dip Zn-based alloy coated steel sheet has good corrosion resistance, and is therefore used for a wide range of purposes such as a construction member and an automobile member. In particular, a hot dip Zn—Al—Mg-based alloy coated steel sheet which includes a coating layer having an Al concentration of not less than 1% by mass is in increasing demand as an alternative to a conventional hot dip Zn coated steel sheet, because the hot dip Zn—Al—Mg-based alloy coated steel sheet maintains excellent corrosion resistance over a long time period. Note that a coating layer included in a conventional hot dip Zn coated steel sheet generally has an Al concentration of not more than 0.3% by mass (see JIS G3302).

In a case where hot dip Zn-based alloy coated steel sheets are used for a construction member, an automobile member, or the like, the hot dip Zn-based alloy coated steel sheets are often assembled by an arc welding process. However, in a case where the hot dip Zn-based alloy coated steel sheets are arc-welded, spatters, pits, and blowholes (hereinafter, a "blowhole" includes a pit unless otherwise stated) are excessively generated. That is, the hot dip Zn-based alloy coated steel sheets are poor in arc weldability. The reason why a spatter is generated is as follows. That is, since a boiling point of Zn is approximately 906° C. and a melting point of Fe is approximately 1538° C., i.e., the boiling point of Zn is lower than the melting point of Fe, Zn vapor is generated during arc welding. The Zn vapor causes an arc to be unstable. As a result, a spatter is generated. Furthermore, in a case where a molten pool solidifies before the Zn vapor comes out of the molten pool, a blowhole is generated. In a case where the spatters adhere to coated surfaces, a welded part becomes poor in appearance. In addition, since corrosion starts to occur from part of the coated surfaces to which part the spatters adhere, the hot dip Zn-based alloy coated steel sheets become poor in corrosion resistance. Moreover, in a case where the blowholes are excessively generated, strength of the welded part is unfortunately decreased.

In particular, a heavy-weight hot dip Zn-based alloy coated steel sheet having a coating weight of not less than 120 g/m² is used for a member which is required to have long-term durability. However, as a hot dip Zn-based alloy coated steel sheet becomes heavier in weight, an amount of Zn vapor generated during arc welding becomes larger. Therefore, spatters and blowholes are excessively generated.

As a method of suppressing generation of a spatter and a blowhole on/in a hot dip Zn-based alloy coated steel sheet, a pulsed arc welding process is suggested. According to the pulsed arc welding process, a droplet is caused to be small. This suppresses generation of a spatter. Furthermore, due to a pulsed arc, a molten pool is stirred, and is pushed down so that the molten pool becomes thin. This promotes an escape of Zn vapor from the molten pool, and ultimately suppresses generation of a blowhole.

For example, Patent Literature 1 discloses a pulsed arc welding process in which (i) a composition of a welding wire and (ii) a peak current, a peak time, and a base current shown in a pulsed current waveform are controlled so as to fall within respective suitable ranges so that generation of a spatter and a blowhole is suppressed.

CITATION LIST

Patent Literature

[Patent Literature 1] Japanese Patent Application Publication, Tokukaihei, No. 9-206984 (1997)

SUMMARY OF INVENTION

Technical Problem

However, Patent Literature 1 only discloses an example of a light-weight hot dip Zn coated steel sheet having a coating weight of 45 g/m² per surface, and does not disclose how to suppress generation of a spatter and a blowhole on/in a heavy-weight hot dip Zn-based alloy coated steel sheet.

Furthermore, according to Patent Literature 1, an object to be subjected to welding is a hot dip Zn coated steel sheet which includes a coating layer generally having an Al concentration of not more than 0.3% by mass. Depending on an Al concentration, a melting point of a coating layer varies. As such, the Al concentration of the coating layer affects behavior of the coating layer during welding. Therefore, it is not possible to apply, as it is, the technique of Patent Literature 1 to a hot dip Zn-based alloy coated steel sheet which includes a coating layer having an Al concentration of not less than 1% by mass (for example, a hot dip Zn—Al—Mg-based alloy coated steel sheet).

As described above, a hot dip Zn-based alloy coated steel sheet which includes a coating layer having an Al concentration of not less than 1% by mass is excellent in corrosion resistance. However, in a case where such hot dip Zn-based alloy coated steel sheets are arc-welded, spatters and blowholes are generated so that a welded part becomes poor in appearance and strength. In view of the circumstances, an object of the present invention is to provide (i) a method of arc-welding hot dip Zn-based alloy coated steel sheets each of which includes a coating layer having an Al concentration of not less than 1% by mass, which method allows a welded part to be excellent in appearance and strength, and (ii) a welded member, which has a welded part excellent in appearance and strength.

Solution to Problem

The inventors of the present invention found, as a result of a study, that, in a case where hot dip Zn-based alloy coated steel sheets each of which includes a coating layer having an Al concentration of not less than 1% by mass are arc-welded, it is possible to suppress generation of a spatter and a blowhole, without damaging an appearance of a welded part, by (i) employing a pulsed arc welding process and (ii) controlling an average welding current, an average welding voltage, a pulse period, the Al concentration of the coating layer, and a coating weight so as to fall within respective suitable ranges. Consequently, the inventors of the present invention completed the present invention.

A method of arc-welding hot dip Zn-based alloy coated steel sheets in accordance with an embodiment of the present invention is a method of arc-welding hot dip Zn-based alloy coated steel sheets each of which includes a coating layer that contains Zn as a main component and that contains Al at a concentration of 1.0% by mass to 22.0% by mass and each of which has a coating weight W of 15 g/m² to 250 g/m², the hot dip Zn-based alloy coated steel sheets being arc-welded in such a way that (a) a current waveform formed by a welding current is a pulsed current waveform in which (i) a peak current and a base current alternate with each other at a pulse period of 1 ms to 50 ms and (ii) an average welding current is 100 A to 350 A and (b) an average welding voltage is 20 V to 35 V.

Advantageous Effects of Invention

According to the present invention, it is possible to suppress generation of a spatter and a blowhole during arc welding of hot dip Zn-based alloy coated steel sheets, and accordingly possible to provide a welded member which has a welded part that is excellent in appearance and strength and which is accordingly excellent in corrosion resistance.

DESCRIPTION OF EMBODIMENTS

Figure 1:
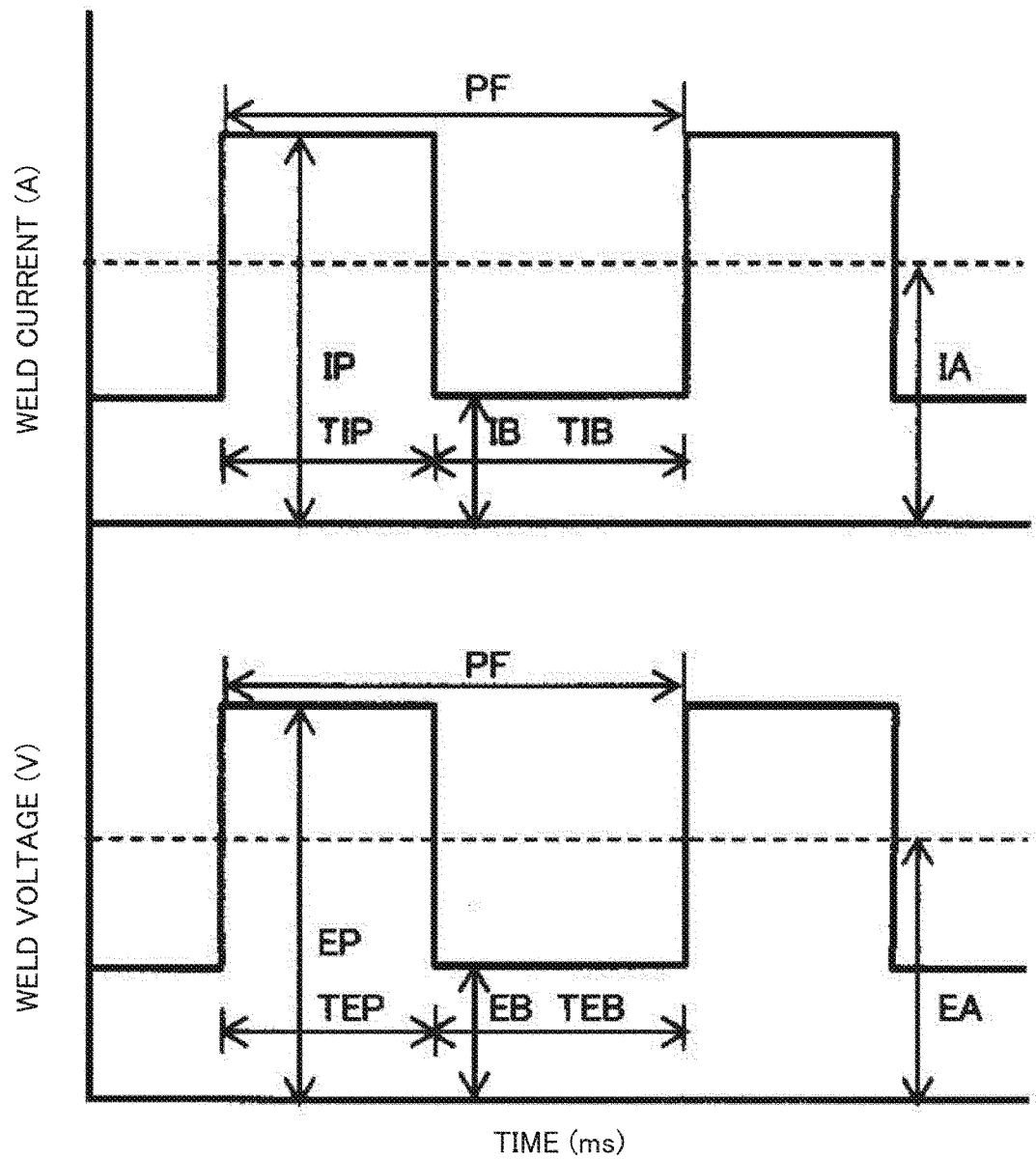
FIG. 1 is a view schematically illustrating a pulsed current waveform and a pulsed voltage waveform.

FIG. 1 schematically illustrates a current waveform and a voltage waveform observed in a pulsed arc welding method. The pulsed arc welding method is an arc welding method in which a peak current IP and a base current IB are caused to alternate with each other. The peak current IP is set to be equal to or higher than a critical current at which transfer of a small droplet, that is, spray transfer is carried out. In a case where the peak current IP is equal to or higher than the critical current, a narrow is formed in a droplet at a tip of a welding wire due to a pinch effect of electromagnetic force, so that the droplet becomes smaller and, accordingly, droplet transfer is regularly carried out for every pulse period. This ultimately suppresses generation of a spatter. In contrast, in a case where the peak current IP is equal to or lower than the critical current, the droplet transfer is irregularly carried out, and the droplet becomes larger. This causes the droplet and a molten pool to be short-circuited, and ultimately causes a spatter.

Figure 2:
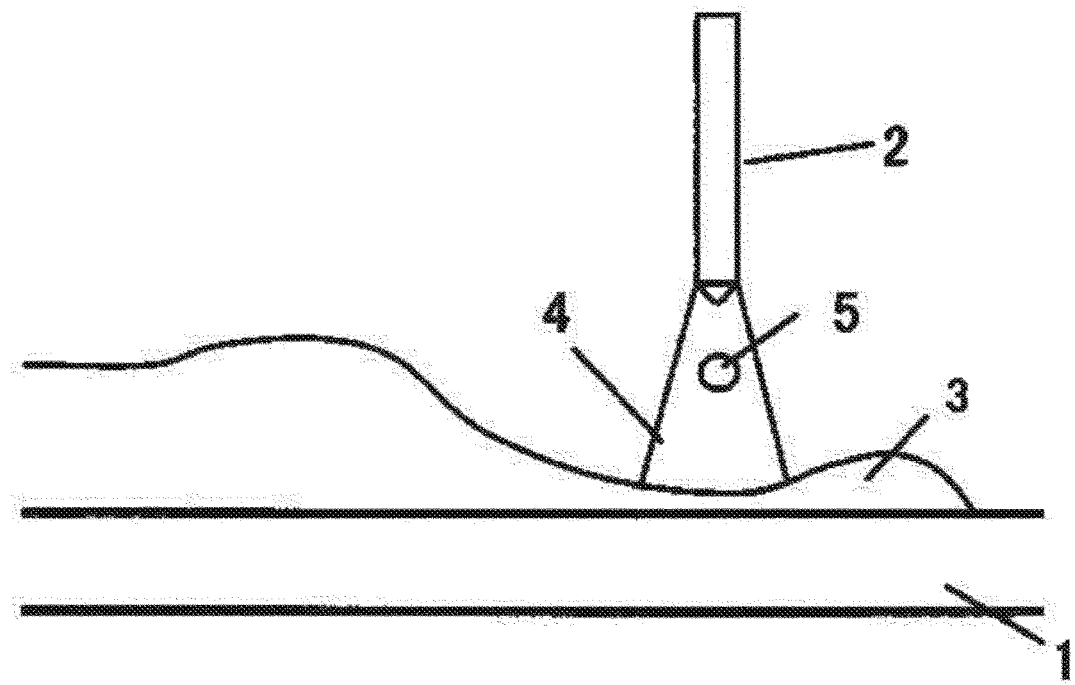
FIG. 2 is a view schematically illustrating a pulsed arc welding phenomenon.

FIG. 2 schematically illustrates a welding phenomenon observed in the pulsed arc welding method. According to pulsed arc welding, a small droplet 5 is transferred from a welding wire 2 to a molten pool 3, that is, spray transfer is carried out. Therefore, no short circuiting is caused, and generation of a spatter is suppressed. Furthermore, due to a pulsed arc 4, the molten pool 3 located immediately below the pulsed arc 4 is pushed down so that the molten pool 3 becomes thin. This causes Zn vapor to be easily discharged from the molten pool 3, and ultimately suppresses generation of a blowhole.

However, in a case of a heavy-weight material having a heavy coating weight, Zn vapor is generated in a large amount. Therefore, even in a case where the pulsed arc welding method is employed, some Zn vapor does not come out of a molten pool, and remains in the molten pool. This is likely to cause a blowhole. Furthermore, in a case where the some Zn vapor remaining in the molten pool blows out from the molten pool at once, an arc is disturbed. This is likely to cause a spatter. In view of the circumstances, according to an embodiment of the present invention, by (i) controlling an average welding current, an average welding voltage, and a pulse period so as to fall within respective suitable ranges and (ii) suitably managing an Al concentration of a coating layer and a coating weight, viscosity of a molten pool is decreased so that discharge of Zn vapor is promoted and, consequently, generation of a spatter and a blowhole is suppressed.

Figure 3:
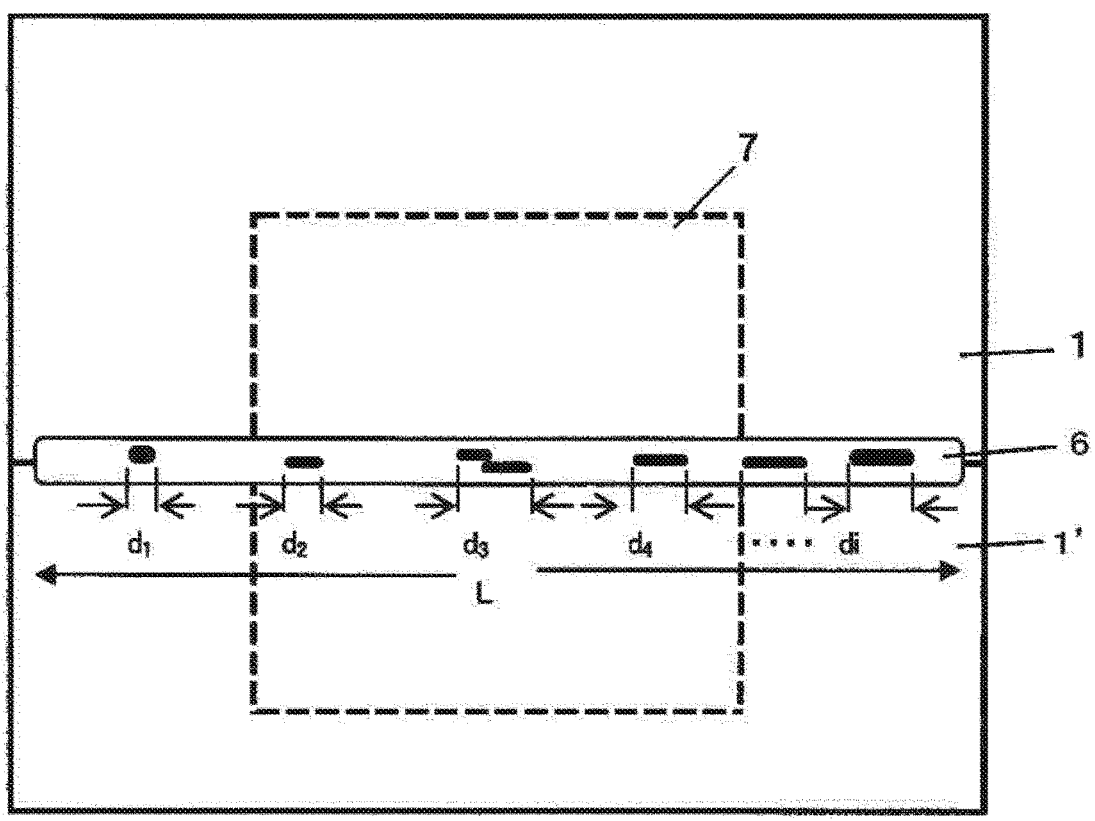
FIG. 3 is a view for explaining (i) how to count adhering spatters and (ii) a definition of a blowhole occupancy.

Hot dip Zn-based alloy coated steel sheet samples were laboratorially produced. Those samples varied in coating weight per surface between 15 g/m² and 250 g/m². Further, while coating layers of the samples each had an Mg concentration of 3% by mass, the coating layers varied in Al concentration between 1% by mass and 22% by mass. Note that the samples each had a thickness of 3.2 mm, a width of 100 mm, and a length of 200 mm. Out of the samples, the same kind of samples were fillet-welded in the form of a lap joint so that an overlap width was 30 mm and a length of a weld bead was 180 mm. Here, a welded member made up of hot dip Zn-based alloy coated steel sheets which were joined to each other was produced by pulsed arc welding in which an average welding current was set within a range of 100 A to 350 A, an average welding voltage was set within a range of 20 V to 35 V, and the pulse period was set within a range of 1 ms to 50 ms, as appropriate. An x-ray transmissive image of an arc-welded part was captured. Thereafter, as schematically illustrated in FIG. 3, lengths dl through di of blowholes each extending along a longitudinal direction of a weld bead 6 were measured, and the lengths dl through di thus measured were accumulated so as to obtain an accumulated value $\Sigma di$ (mm). By substituting the accumulated value $\Sigma di$ into the following expression (2), an occupancy Br of the blowholes (hereinafter, referred to as a blowhole occupancy Br) was calculated. Furthermore, the number of spatters adhering to a region 7 which had a width 100 mm and a length of 100 mm and in which the weld bead 6 was middled (see a dotted line illustrated in FIG. 3) was visually determined. The region 7 was a 100-mm-square region having (i) two sides each of which was parallel to the longitudinal direction of the weld bead 6 and at a location equidistant from which the weld bead 6 was located and (ii)

two sides each of which was perpendicular to the longitudinal direction of the weld bead 6.

$$Br=(\Sigma di/L) \times 100 \quad (2)$$

Figure 4:
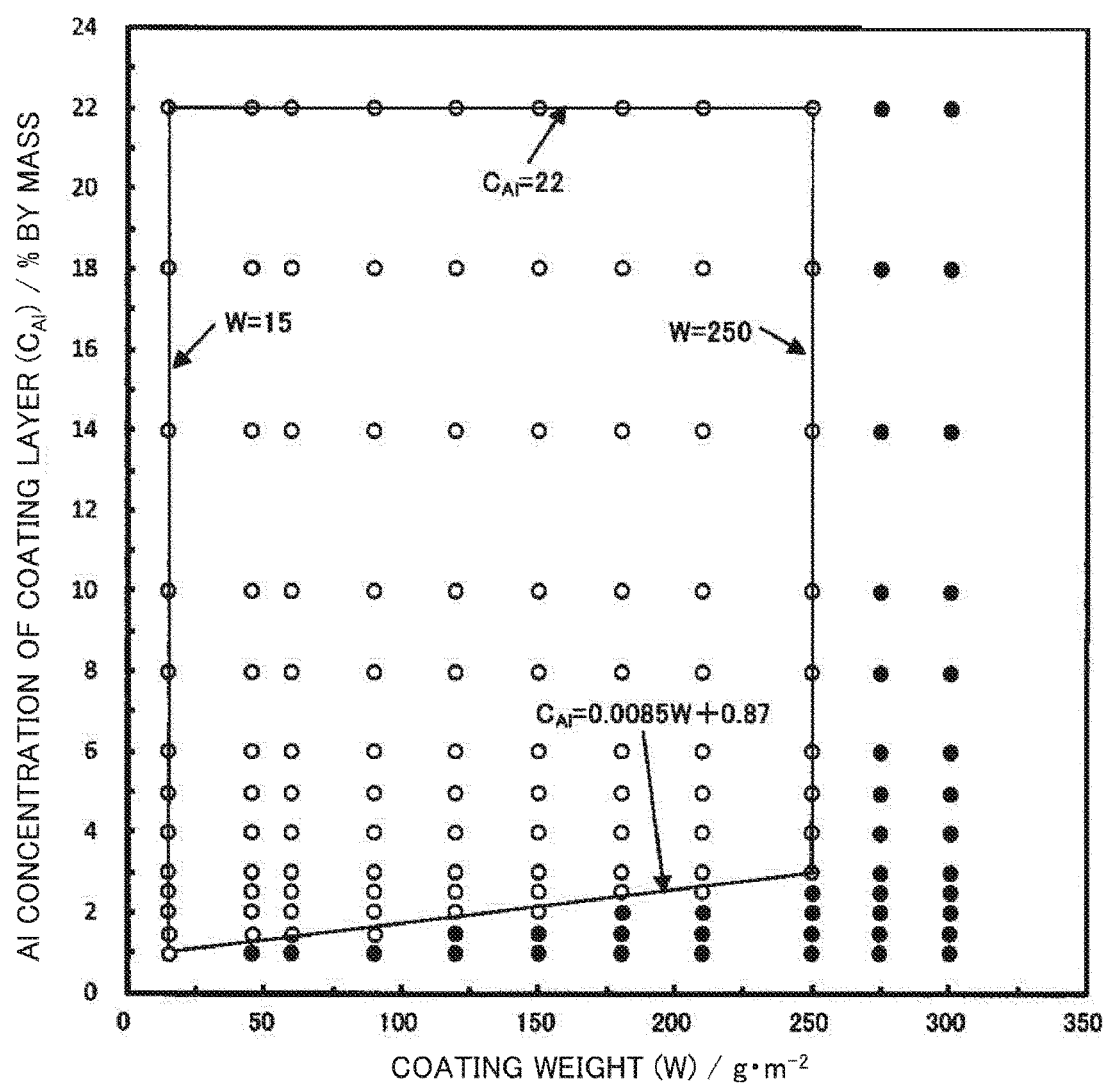
FIG. 4 is a view illustrating a lower limit of a suitable Al concentration of a coating layer in accordance with an embodiment of the present invention.

FIG. 4 illustrates results of studying an effect of an Al concentration of a coating layer and an effect of a coating weight on a blowhole occupancy Br and the number of adhering spatters. According to the *Kenchikuyo hakuban yousetsusetsugoubu sekkei sekou manyuaru* (manual for designing and implementing welded joints of constructional sheets) (editorial board of a manual for designing and implementing welded joints of constructional sheets), it is considered that there is no problem with strength of a welded part in a case where a blowhole occupancy Br is not more than 30%. Furthermore, in a case where the number of adhering spatters is not more than 20, such a spatter(s) is/are not noticeable and also hardly affect corrosion resistance. In view of the above, in FIG. 4, a case where the blowhole occupancy was not more than 30% and the number of adhering spatters was not more than 20 is plotted with a white circle, and a case where the blowhole occupancy was more than 30% and/or the number of adhering spatters was more than 20 is plotted with a black circle. In a region enclosed by four straight lines (see FIG. 4), the blowhole occupancy Br is not more than 30% and the number of adhering spatters is not more than 20. It is found that, by suitably managing the coating weight and the Al concentration, it is possible to suppress generation of a spatter and a blowhole.

That is, as illustrated in FIG. 4, it is possible to suppress generation of a spatter and a blowhole by pulsed-arc-welding hot dip Zn-based alloy coated steel sheets each of which includes a coating layer having an Al concentration of 1% by mass to 22% by mass and each of which has a coating weight of 15 g/m² to 250 g/m² per surface, while an average welding current is being set within a range of 100 A to 350 A, an average welding voltage is being set within a range of 20 V to 35 V, and a pulse period is being set within a range of 1 ms to 50 ms, as appropriate.

Note that it is shown in FIG. 4 that, in a case where the Al concentration $C_{Al}$ (% by mass) of the coating layer and the coating weight W (g/m²) satisfy $C_{Al}<0.0085W+0.87$, the blowhole occupancy is more than 30% and/or the number of adhering spatters is more than 20. However, it is possible to cause (i) the blowhole occupancy to be not more than 30% and (ii) the number of adhering spatters to be not more than 20, by appropriately controlling a pulsed arc welding condition(s), other than the average welding current, the average welding voltage, and the pulse period, under which the pulsed arc welding is carried out. That is, in a case where the coating weight is 15 g/m² to 250 g/m² and $C_{Al}<0.0085W+0.87$, it is necessary to control a welding speed and a composition of a shielding gas in addition to the average welding current, the average welding voltage, and the pulse period, in order to cause (i) the blowhole occupancy to be not more than 30% and (ii) the number of adhering spatters to be not more than 20. However, in a case where the coating weight is 15 g/m² to 250 g/m² and $0.0085W+0.87 \le C_{Al}$, it is only necessary to control the average welding current, the average welding voltage, and the pulse period. Therefore, in order to cause (i) the blowhole occupancy to be not more than 30% and (ii) the number of adhering spatters to be not more than 20, it is preferable that $0.0085W+0.87 \le C_{Al}$.

Pulsed arc welding conditions in accordance with an embodiment of the present invention will be described below in detail.

[Average Welding Current]

According to an embodiment of the present invention, as illustrated in FIG. 1, a current waveform is preferably a pulse waveform in which a peak current and a base current alternate with each other. Furthermore, in the pulse waveform, an average welding current IA preferably falls within a range of 100 A to 350 A. According to an embodiment of the present invention, the average welding current IA is calculated from the following expression (3).

$$IA=((IP \times TIP)+(IB \times TIB))/(TIP+TIB) \quad (3)$$

where:
IP represents a peak current (A);
IB represents a base current (A);
TIP represents a time period (ms) of the peak current; and
TIB represents a time period (ms) of the base current.

In a case where the average welding current is less than 100 A, a sufficient amount of heat is not inputted. This causes a decrease in temperature of a molten pool and, accordingly, causes an increase in viscosity of the molten pool. As a result, Zn vapor is not easily discharged from the molten pool and part of the Zn vapor remains in the molten pool, so that a blowhole is generated. Note that a welding current is related to a rate of feeding of a welding wire. In a case where the welding current is unnecessarily increased, a droplet is oversized. This causes the droplet and the molten pool to be short-circuited, and ultimately causes a spatter. Therefore, the average welding current is preferably not more than 350 A.

[Average Welding Voltage]

According to the an embodiment of present invention, an average welding voltage EA preferably falls within a range of 20 V to 35 V. According to an embodiment of the present invention, the average welding voltage EA is calculated from the following expression (4).

$$EA=((EP \times TEP)+(EB \times TEB))/(TEP+TEB) \quad (4)$$

where:
EP represents a peak voltage (V);
EB represents a base voltage (V);
TEP represents a time period (ms) of the peak voltage; and
TEB represents a time period (ms) of the base voltage.

In a case where the average welding voltage EA is less than 20 V, a length of an arc becomes short. This causes the droplet and the molten pool to be short-circuited, and ultimately causes a spatter. In a case where the average welding voltage is more than 35 V, an excessive amount of heat is inputted. This causes burn-through.

[Pulse Period]

A pulse period PF is set so as to fall within a range of 1 ms to 50 ms. In a case where the pulse period PF is less than 1 ms, droplet transfer becomes unstable. This causes a spatter. In a case where the pulse period PF is more than 50 ms, a time period during which the arc is not generated becomes too long. This causes an effect of pushing down the molten pool to be reduced. As a result, the Zn vapor is not easily discharged from the molten pool, so that a spatter and a blowhole are generated.

[Welding Speed]

According to an embodiment of the present invention, a welding speed is not limited in particular. The welding speed is selected as appropriate depending on thicknesses of hot dip Zn-based alloy coated steel sheets.

[Shielding Gas]

In a pulsed arc welding process, an Ar—$CO_2$ mixed gas is used so that transfer of a small droplet, that is, spray transfer is carried out. Also in an embodiment of the present invention, an Ar—$CO_2$ mixed gas is used as a shielding gas. An Ar-30% $CO_2$ gas containing $CO_2$ at a concentration of 30% by volume, an Ar-20% $CO_2$ gas containing $CO_2$ at a concentration of 20% by volume, an Ar-5% $CO_2$ gas containing $CO_2$ at a concentration of 5% by volume, which concentration is much lower than those of $CO_2$ contained in the Ar-30% $CO_2$ gas and the Ar-20% $CO_2$ gas, and the like are suitably used because those gases have a great effect of suppressing generation of a spatter.

[Hot Dip Zn-Based Alloy Coated Steel Sheet]

A hot dip Zn-based alloy coated steel sheet in accordance with an embodiment of the present invention includes a coating layer which contains Zn as a main component and which contains Al at a concentration of 1.0% by mass to 22.0% by mass, and has a coating weight W of 15 g/m² to 250 g/m².

The coating weight W and an Al concentration $C_{Al}$ of the coating layer preferably satisfy the following expression (1).

$$0.0085W + 0.87 \leq C_{Al} \leq 22 \quad (1)$$

where:
W represents a coating weight (g/m²); and
$C_{Al}$ represents an Al concentration (% by mass) of a coating layer.

The coating layer of the hot dip Zn-based alloy coated steel sheet can further contain at least one selected from the group consisting of Mg, Ti, B, Si, and Fe. In this case, the coating layer can contain Mg at a concentration of 0.05% by mass to 10.0% by mass, Ti at a concentration of 0.002% by mass to 0.10% by mass, B at a concentration of 0.001% by mass to 0.05% by mass, Si at a concentration of 0% by mass to 2.0%, and/or Fe at a concentration of 0% by mass to 2.5% by mass.

A hot dip coating method is not limited in particular. However, in general, it is advantageous in terms of a cost to use an in-line annealing type hot dip coating machine. A composition of the coating layer substantially reflects a composition of a hot dip coating bath. Component elements contained in the coating layer will be described below. Note that "%" used to describe the component elements of the coating layer means "% by mass" unless otherwise stated.

Figure 5:
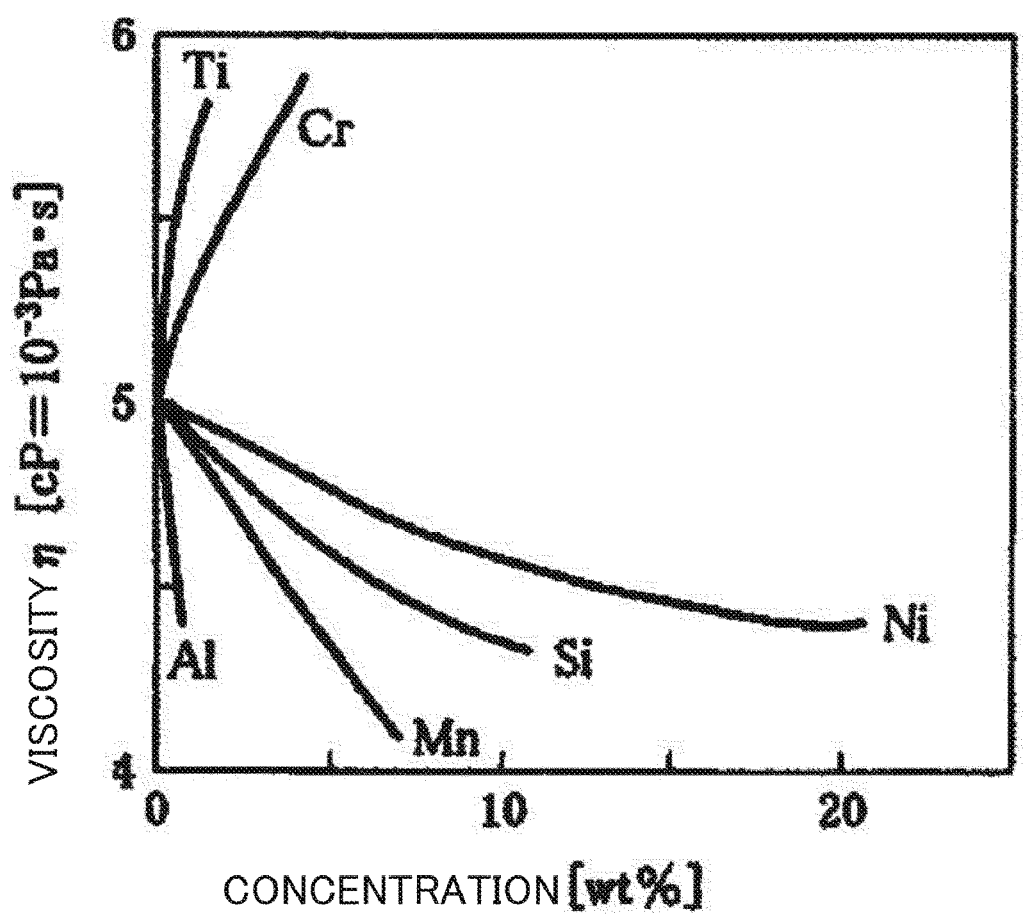
FIG. 5 is a view illustrating how elements contained in the coating layer affect viscosity of Fe.

Al is effective in improving corrosion resistance of the coated steel sheet. Furthermore, Al suppresses generation of Mg oxide-based dross in the hot dip coating bath. Moreover, as illustrated in FIG. 5, even in a case where Al is small in amount, Al has an effect of decreasing viscosity of Fe. Al contained in the coating layer is taken in the molten pool during arc welding so that the viscosity of the molten pool is decreased. This promotes discharge of the Zn vapor and, ultimately, suppresses generation of a spatter and a blowhole. In order to sufficiently exert those effects, it is necessary to ensure that the hot dip coating bath contains Al at a concentration of not less than 1.0%, more preferably not less than 4.0%. In contrast, in a case where the hot dip coating bath contains Al at a high concentration, an Fe—Al alloy layer, which is brittle, is likely to grow under the coating layer. Excessive growth of such an Fe—Al alloy layer causes a decrease in adhesion of the coating layer. As a result of various studies, the hot dip coating bath preferably contains Al at a concentration of not more than 22.0%. Alternatively, the hot dip coating bath can be each controlled so as to contain Al at a concentration of not more than 15.0% or not more than 10.0%.

Mg has an effect of uniformly producing a corrosion product on a surface of the coating layer so that the corrosion resistance of the coated steel sheet is remarkably enhanced. It is more effective that the hot dip coating bath contain Mg at a concentration of not less than 0.05%, more preferably not less than 1.0%. However, in a case where the hot dip coating bath contains Mg at a high concentration, Mg oxide-based dross is likely to be generated. Since the Mg oxide-based dross causes a reduction in quality of the coating layer, the hot dip coating bath is controlled so as to contain Mg at a concentration of not more than 10.0%. Moreover, since a boiling point of Mg is approximately 1091° C., which is lower than a melting point of Fe, Mg is vaporized during the arc welding, as with the case of Zn. It is considered that Mg vapor thus generated causes a spatter and a blowhole. Therefore, the hot dip coating bath preferably contains Mg at a concentration of not more than 10.0%.

In a case where the hot dip coating bath contains Ti, generation and growth of a $Zn_{11}Mg_2$-based phase, which causes the coating layer to be poor in appearance and which causes the coated steel sheet to be poor in corrosion resistance, are suppressed. Therefore, the hot dip coating bath preferably contains Ti. In a case where a concentration of Ti contained in the hot dip coating bath is less than 0.002%, such a suppressing effect is not sufficiently exerted. In a case where the concentration of Ti is more than 0.1%, the surface of the coating layer becomes poor in appearance due to generation and growth of a Ti—Al-based precipitate during coating. Therefore, according to an embodiment of the present invention, the concentration of Ti contained in the hot dip coating bath is limited to 0.002% to 0.1%.

As with the case of Ti, B also has an effect of suppressing generation and growth of a $Zn_{11}Mg_2$-based phase. In a case of B, it is more effective that the hot dip coating bath contain B at a concentration of not less than 0.001%. Note, however, that, in a case where the hot dip coating bath contains B at a high concentration, the surface of the coating layer becomes poor in appearance due to a Ti—B-based or Al—B-based precipitate. Therefore, the hot dip coating bath is preferably controlled so as to contain B at a concentration of not more than 0.05%.

In a case where the hot dip coating bath contains Si, excessive growth of an Fe—Al alloy layer, which is generated at an interface between the coating layer and a surface of a base steel sheet, is suppressed. This advantageously improves workability of a hot dip Zn—Al—Mg-based alloy coated steel sheet. Therefore, the hot dip coating bath can contain Si as necessary. In this case, it is more effective that the hot dip coating bath contain Si at a concentration of not less than 0.005%. Note, however, that, in a case where the hot dip coating bath contains Si at a high concentration, this results in an increase in amount of dross in the hot dip coating bath. Therefore, the hot dip coating bath preferably contains Si at a concentration of not more than 2.0%.

Since the base steel sheet is dipped in and caused to pass through the hot dip coating bath, Fe is likely to be mixed in the hot dip coating bath. In a case where Fe is mixed in a Zn—Al—Mg-based coating layer, the hot dip Zn—Al—Mg-based alloy coated steel sheet becomes poor in corrosion resistance. Therefore, the hot dip coating bath preferably contains Fe at a concentration of not more than 2.5%.

[Coating Weight]

In a case where the hot dip Zn—Al—Mg-based alloy coated steel sheet has a light coating weight, this causes an disadvantage in maintaining corrosion resistance and a sacrificial protection effect of a coated surface of the hot dip Zn—Al—Mg-based alloy coated steel sheet over a long time period. As a result of various studies, it is more effective that the hot dip Zn—Al—Mg-based alloy coated steel sheet have a coating weight of not less than 15 g/m² per surface. In a case where the coating weight is more than 250 g/m², the Zn vapor is generated in an excessive amount, and it becomes difficult to suppress generation of a spatter and a blowhole even by the method of the present invention. Therefore, an upper limit of the coating weight is 250 g/m².

[Blowhole Occupancy, Number of Adhering Spatters]

According to the *Kenchikuyo hakuban yousetsusetsugoubu sekkei sekou manyuaru* (manual for designing and implementing welded joints of constructional sheets) (editorial board of a manual for designing and implementing welded joints of constructional sheets), it is considered that there is no problem with strength of a welded part in a case where a blowhole occupancy Br, which is calculated by substituting into the following expression (2) a value Σdi (mm) obtained by accumulating lengths of blowholes schematically illustrated in FIG. 3, is not more than 30%. A welded member in accordance with an embodiment of the present invention has a welded part which has a blowhole occupancy Br of not more than 30% and which is accordingly excellent in strength.

$$Br = (\Sigma di/L) \times 100 \quad (2)$$

where: Σdi represents a value (mm) obtained by accumulating lengths of blowholes; and
L represents a length (mm) of a weld bead.

In a case where the number of spatters adhering to a region 7, which has a width of 100 mm and a length of 100 mm and in which a weld bead is middled (see a region enclosed by a dotted line in FIG. 3), is not more than 20, such a spatter(s) is/are not noticeable and also hardly affect corrosion resistance. According to the welded member in accordance with an embodiment of the present invention, the number of spatters is not more than 20, and, accordingly, the welded part is excellent in appearance and the welded member is excellent in corrosion resistance.

A method of arc-welding hot dip Zn-based alloy coated steel sheets in accordance with an embodiment of the present invention is a method of arc-welding hot dip Zn-based alloy coated steel sheets each of which includes a coating layer that contains Zn as a main component and that contains Al at a concentration of 1.0% by mass to 22.0% by mass and each of which has a coating weight W of 15 g/m² to 250 g/m², the hot dip Zn-based alloy coated steel sheets being arc-welded in such a way that (a) a current waveform formed by a welding current is a pulsed current waveform in which (i) a peak current and a base current alternate with each other at a pulse period of 1 ms to 50 ms and (ii) an average welding current is 100 A to 350 A and (b) an average welding voltage is 20 V to 35 V.

Further, the method of arc-welding hot dip Zn-based alloy coated steel sheets in accordance with an embodiment of the present invention is preferably arranged such that the coating weight W (g/m²) of the each of the hot dip Zn-based alloy coated steel sheets and an Al concentration $C_{Al}$ (% by mass) of the coating layer included in the each of the hot dip Zn-based alloy coated steel sheets satisfy the following expression (1):

$$0.0085W + 0.87 \leq C_{Al} \leq 22 \quad (1).$$

Further, the method of arc-welding hot dip Zn-based alloy coated steel sheets in accordance with an embodiment of the present invention can be arranged such that the coating layer included in the each of the hot dip Zn-based alloy coated steel sheets further contains at least one selected from the group consisting of Mg, Ti, B, Si, and Fe, the coating layer containing the Mg at a concentration of 0.05% by mass to 10.0% by mass, the Ti at a concentration of 0.002% by mass to 0.10% by mass, the B at a concentration of 0.001% by mass to 0.05% by mass, the Si at a concentration of 0% by mass to 2.0% by mass, and/or the Fe at a concentration of 0% by mass to 2.5% by mass.

Further, the method of arc-welding hot dip Zn-based alloy coated steel sheets in accordance with an embodiment of the present invention can be arranged such that the hot dip Zn-based alloy coated steel sheets are arc-welded so that: a number of spatters adhering to a region, which has a length of 100 mm and a width of 100 mm and in which a weld bead is middled, is not more than 20; and a blowhole occupancy Br, which is calculated from the following expression (2), is not more than 30%:

$$Br = (\Sigma di/L) \times 100 \quad (2)$$

where:
di represents a length of the ith blowhole observed; and
L represents a length of the weld bead.

A method of producing a welded member in accordance with an embodiment of the present invention is a method of producing a welded member by arc-welding hot dip Zn-based alloy coated steel sheets each of which includes a coating layer that contains Zn as a main component and that contains Al at a concentration of 1.0% by mass to 22.0% by mass, each of the hot dip Zn-based alloy coated steel sheets having a coating weight W of 15 g/m² to 250 g/m² per surface, the hot dip Zn-based alloy coated steel sheets being arc-welded in such a way that (a) a current waveform formed by a welding current is a pulsed current waveform in which (i) a peak current and a base current alternate with each other at a pulse period of 1 ms to 50 ms and (ii) an average welding current is 100 A to 350 A and (b) an average welding voltage is 20 V to 35 V.

A welded member in accordance with an embodiment of the present invention is a welded member obtained by welding hot dip Zn-based alloy coated steel sheets each of which includes a coating layer that contains Zn as a main component and that contains Al at a concentration of 1.0% by mass to 22.0% by mass, each of the hot dip Zn-based alloy coated steel sheets having a coating weight W of 15 g/m² to 250 g/m² per surface, a number of spatters adhering to a region, which has a length of 100 mm and a width of 100 mm and in which a weld bead is middled, being not more than 20, a blowhole occupancy Br being not more than 30%. The welded member has a welded part that is excellent in appearance, and is excellent in corrosion resistance.

EXAMPLES

A cold-rolled steel strip having a thickness of 3.2 mm and a width of 1000 mm was used as a base steel sheet. The cold-rolled steel strip was caused to pass through a hot dip coating line so as to produce a hot dip Zn—Al—Mg-based alloy coated steel sheet.

Samples each having a width of 100 mm and a length of 200 mm were cut off from the hot dip Zn—Al—Mg-based alloy coated steel sheet, and were pulsed-arc-welded so that the samples were fillet-welded in the form of a lap joint. As a solid wire, JIS Z3312 YGW12 was used. A welding speed was 0.4 m/min. A length of a welding bead was 180 mm. An overlap width was 30 mm. The other pulsed arc welding conditions are shown in Tables 1 and 2. After pulsed arc welding, an x-ray transmissive image was captured, and a blowhole occupancy Br was determined by the above-described method. Furthermore, the number of adhering spatters was visually determined.

Table 1 shows Examples in each of which pulsed arc welding in accordance with an embodiment of the present invention was carried out. Table 2 shows (i) Reference Examples in each of which an Al concentration $C_{Al}$ (% by mass) of a coating layer and a coating weight W (g/m$^2$) satisfied $C_{Al}$<0.0085W+0.87 and (ii) Comparative Examples in each of which pulsed arc welding was carried out under a condition that an Al concentration of a coating layer was outside a range required for the present invention.

TABLE 1

| No. | Coating weight per surface (g/m$^2$) | Lower limit of Al concentration ($C_{Al}$ = 0.0085W + 0.87) (% by mass) | Composition of coating layer (% by mass) Al | Mg | Ti | B | Si | Fe | Presence or absence of $Zn_{11}Mg_2$-based phase |
|---|---|---|---|---|---|---|---|---|---|
| 1 | 15 | 1.0 | 1.5 | 1.2 | — | — | — | — | Present |
| 2 | 46 | 1.3 | 2.1 | 1.1 | 0.098 | — | — | — | Absent |
| 3 | 60 | 1.4 | 1.8 | 3.1 | — | 0.006 | — | — | Absent |
| 4 | 88 | 1.6 | 2.8 | 1.2 | — | — | 0.87 | — | Absent |
| 5 | 118 | 1.9 | 2.1 | 0.1 | — | — | — | 0.09 | Absent |
| 6 | 188 | 2.5 | 3.2 | 1.3 | 0.004 | 0.003 | — | — | Absent |
| 7 | 245 | 3.0 | 3.6 | 1.1 | 0.003 | 0.047 | 0.11 | — | Absent |
| 8 | 42 | 1.2 | 4.2 | 1.0 | 0.004 | 0.002 | 0.91 | 0.02 | Absent |
| 9 | 87 | 1.6 | 4.1 | 1.2 | 0.008 | 0.021 | — | 0.08 | Absent |
| 10 | 114 | 1.8 | 4.5 | 1.2 | 0.091 | — | 0.01 | 0.11 | Absent |
| 11 | 189 | 2.5 | 3.8 | 0.9 | — | 0.023 | 0.01 | — | Absent |
| 12 | 243 | 2.9 | 3.9 | 1.1 | 0.093 | 0.045 | 0.12 | 0.03 | Absent |
| 13 | 30 | 1.1 | 5.8 | 2.9 | 0.013 | 0.019 | 0.22 | 1.22 | Absent |
| 14 | 57 | 1.4 | 5.8 | 3.1 | 0.054 | 0.006 | 0.23 | 0.33 | Absent |
| 15 | 97 | 1.7 | 6.1 | 3.3 | 0.078 | 0.002 | 0.99 | 1.23 | Absent |
| 16 | 132 | 2.0 | 6.3 | 2.9 | 0.043 | 0.047 | 0.89 | 0.11 | Absent |
| 17 | 178 | 2.4 | 6.0 | 3.0 | 0.055 | 0.045 | — | 0.09 | Absent |
| 18 | 245 | 3.0 | 5.8 | 3.2 | 0.058 | 0.011 | 1.89 | 0.10 | Absent |
| 19 | 58 | 1.4 | 10.9 | 3.0 | 0.045 | 0.008 | 0.12 | 0.23 | Absent |
| 20 | 93 | 1.7 | 11.0 | 2.9 | 0.098 | 0.023 | 0.09 | 0.18 | Present |
| 21 | 145 | 2.1 | 10.4 | 2.8 | 0.002 | 0.033 | 0.02 | 0.09 | Absent |
| 22 | 189 | 2.5 | 10.9 | 3.2 | 0.078 | 0.002 | 0.01 | 0.08 | Absent |
| 23 | 243 | 2.9 | 11.1 | 3.1 | 0.089 | 0.044 | 0.22 | 0.12 | Absent |
| 24 | 45 | 1.3 | 16.2 | 5.8 | 0.091 | 0.042 | 1.12 | 2.19 | Absent |
| 25 | 128 | 1.9 | 15.4 | 6.3 | 0.088 | 0.043 | 1.98 | 0.12 | Absent |
| 26 | 231 | 2.8 | 15.5 | 5.4 | 0.077 | 0.043 | 1.21 | 0.01 | Absent |
| 27 | 90 | 1.6 | 19.8 | 9.6 | 0.093 | 0.048 | 1.10 | 1.99 | Absent |
| 28 | 129 | 2.0 | 20.4 | 9.3 | 0.084 | 0.041 | 1.02 | 2.31 | Absent |
| 29 | 187 | 2.5 | 21.6 | 9.6 | 0.090 | 0.034 | 1.99 | 2.01 | Absent |
| 30 | 239 | 2.9 | 21.5 | 9.6 | 0.089 | 0.039 | 1.78 | 2.31 | Absent |

| No. | Pulsed arc welding conditions Composition of shielding gas *"%" indicates "% by volume" | Average welding current (A) | Average welding voltage (V) | Pulse period (ms) | Blowhole occupancy Br (%) | Number of adhering spatters | Classification |
|---|---|---|---|---|---|---|---|
| 1 | Ar-5% $CO_2$ | 100 | 20 | 1 | 5 | 0 | Example |
| 2 | Ar-5% $CO_2$ | 150 | 22 | 5 | 12 | 2 | |
| 3 | Ar-5% $CO_2$ | 200 | 24 | 10 | 16 | 4 | |
| 4 | Ar-5% $CO_2$ | 250 | 26 | 20 | 16 | 3 | |
| 5 | Ar-10% $CO_2$ | 300 | 28 | 30 | 19 | 7 | |
| 6 | Ar-10% $CO_2$ | 325 | 32 | 40 | 25 | 9 | |
| 7 | Ar-10% $CO_2$ | 350 | 35 | 50 | 28 | 16 | |
| 8 | Ar-15% $CO_2$ | 100 | 20 | 1 | 4 | 0 | |
| 9 | Ar-15% $CO_2$ | 200 | 22 | 5 | 8 | 0 | |
| 10 | Ar-15% $CO_2$ | 250 | 24 | 15 | 16 | 3 | |
| 11 | Ar-15% $CO_2$ | 300 | 28 | 25 | 18 | 6 | |
| 12 | Ar-20% $CO_2$ | 350 | 35 | 45 | 25 | 10 | |
| 13 | Ar-20% $CO_2$ | 100 | 22 | 1 | 0 | 0 | |
| 14 | Ar-20% $CO_2$ | 150 | 24 | 5 | 0 | 0 | |
| 15 | Ar-20% $CO_2$ | 200 | 26 | 10 | 4 | 0 | |
| 16 | Ar-30% $CO_2$ | 250 | 28 | 20 | 5 | 2 | |
| 17 | Ar-30% $CO_2$ | 300 | 30 | 30 | 17 | 5 | |
| 18 | Ar-30% $CO_2$ | 350 | 35 | 50 | 22 | 8 | |
| 19 | Ar-30% $CO_2$ | 100 | 20 | 5 | 0 | 0 | |
| 20 | Ar-30% $CO_2$ | 175 | 25 | 10 | 0 | 0 | |
| 21 | Ar-30% $CO_2$ | 200 | 28 | 15 | 4 | 1 | |
| 22 | Ar-30% $CO_2$ | 250 | 30 | 35 | 7 | 2 | |
| 23 | Ar-5% $CO_2$ | 350 | 32 | 50 | 16 | 5 | |
| 24 | Ar-5% $CO_2$ | 125 | 25 | 5 | 0 | 0 | |
| 25 | Ar-5% $CO_2$ | 175 | 28 | 15 | 0 | 2 | |
| 26 | Ar-10% $CO_2$ | 350 | 35 | 45 | 6 | 6 | |
| 27 | Ar-10% $CO_2$ | 120 | 20 | 5 | 4 | 3 | |
| 28 | Ar-15% $CO_2$ | 150 | 25 | 25 | 6 | 3 | |
| 29 | Ar-20% $CO_2$ | 300 | 30 | 30 | 8 | 4 | |
| 30 | Ar-20% $CO_2$ | 350 | 35 | 50 | 11 | 4 | |

TABLE 2

| No. | Coating weight per surface (g/m³) | Lower limit of Al concentration ($C_{Al} = 0.0085W + 0.87$) (% by mass) | Composition of coating layer (% by mass) Al | Mg | Ti | B | Si | Fe | Presence or absence of $Zn_{11}Mg_2$-based phase |
|---|---|---|---|---|---|---|---|---|---|
| 31 | 128 | 2.0 | 1.1 | 1.1 | — | — | — | — | Present |
| 32 | 145 | 2.1 | 1.4 | 1.2 | 0.002 | — | — | — | Absent |
| 33 | 191 | 2.5 | 1.6 | 1.1 | — | 0.006 | — | — | Absent |
| 34 | 248 | 3.0 | 1.8 | 1.2 | — | — | 0.01 | — | Absent |
| 35 | 34 | 1.2 | 2.1 | 0.1 | — | — | — | 0.02 | Absent |
| 36 | 98 | 1.7 | 6.0 | 3.3 | 0.005 | 0.003 | — | — | Absent |
| 37 | 245 | 3.0 | 6.6 | 3.1 | 0.015 | 0.047 | 0.11 | — | Absent |
| 38 | 46 | 1.3 | 6.2 | 3.0 | 0.098 | 0.021 | — | 0.08 | Absent |
| 39 | 87 | 1.6 | 4.1 | 1.2 | 0.004 | 0.002 | 0.91 | 0.02 | Absent |
| 40 | 289 | 3.3 | 3.5 | 2.2 | 0.091 | — | 0.01 | 0.02 | Absent |

| No. | Pulsed arc welding conditions: Composition of shielding gas *"%" indicates "% by volume" | Average welding current (A) | Average welding voltage (V) | Pulse period (ms) | Blowhole occupancy Br (%) | Number of adhering spatters | Classification |
|---|---|---|---|---|---|---|---|
| 31 | Ar-5% $CO_2$ | 100 | 20 | 1 | 45 | 38 | Reference Example |
| 32 | Ar-5% $CO_2$ | 150 | 22 | 5 | 48 | 42 | |
| 33 | Ar-5% $CO_2$ | 200 | 24 | 10 | 66 | 54 | |
| 34 | Ar-5% $CO_2$ | 250 | 26 | 20 | 87 | 64 | |
| 35 | Ar-10% $CO_2$ | 80 | 20 | 30 | 39 | 15 | Comparative Example |
| 36 | Ar-10% $CO_2$ | 400 | 24 | 40 | 25 | 49 | |
| 37 | Ar-10% $CO_2$ | 150 | 18 | 50 | 28 | 46 | |
| 38 | Ar-20% $CO_2$ | 125 | 30 | 0.5 | 24 | 38 | |
| 39 | Ar-20% $CO_2$ | 200 | 22 | 75 | 48 | 54 | |
| 40 | Ar-20% $CO_2$ | 250 | 26 | 20 | 58 | 56 | |

As is clear from No. 1 through 30 shown in Table 1, the blowhole occupancy was not more than 30% and the number of adhering spatters was not more than 20 in each of Examples, in each of which pulsed arc welding conditions and an Al concentration of a coating layer fell within ranges required for the present invention. It is found from Examples that, by the present invention, a hot dip Zn—Al—Mg-based alloy coated steel sheet arc-welded member is obtained which has a welded part that is excellent in appearance and strength and which is excellent in corrosion resistance.

In Reference Examples No. 31 through 34 shown in Table 2, in each of which Reference Examples the Al concentration $C_{Al}$ (% by mass) of the coating layer and the coating weight W (g/m²) satisfied $C_{Al} < 0.0085W + 0.87$, generation of spatters and blowholes was observed. Note, however, that, in a case where $C_{Al} < 0.0085W + 0.87$ is satisfied, it is possible to cause (i) the blowhole occupancy to be not more than 30% and (ii) the number of adhering spatters to be not more than 20, by appropriately controlling the pulsed arc welding conditions other than an average welding current, an average welding voltage, and a pulse period.

In contrast, in Comparative Examples No. 35 through 39, in each of which the average welding current, the average welding voltage, and the pulse period were outside the ranges required for the present invention, spatters and blowholes were excessively generated. Moreover, in Comparative Example No. 40, in which a coating weight was outside a range required for the present invention, spatters and blowholes were excessively generated.

REFERENCE SIGNS LIST 1, 1' Hot dip Zn-based alloy coated steel sheet
2 Welding wire
3 Molten pool
4 Pulsed arc
5 Droplet
6 Weld bead
7 Region in which the number of spatters is determined

What is claimed is:

1. A method of arc-welding hot dip Zn-based alloy coated steel sheets each of which includes a coating layer that contains Zn as a main component and that contains Al at a concentration of 1.0% by mass to 22.0% by mass,
   each of the hot dip Zn-based alloy coated steel sheets having a coating weight W of 15 g/m² to 250 g/m² per surface,
   the hot dip Zn-based alloy coated steel sheets being arc-welded in such a way that (a) a current waveform formed by a welding current is a pulsed current waveform in which (i) a peak current and a base current alternate with each other at a pulse period of 1 ms to 50 ms and (ii) an average welding current is 100 A to 350 A and (b) an average welding voltage is 20 V to 35 V,
   the hot dip Zn-based alloy coated steel sheets being arc-welded with use of an Ar—$CO_2$ mixed gas to which no $O_2$ is added as a shielding gas.

2. The method as set forth in claim 1, wherein the coating weight W (g/m²) of the each of the hot dip Zn-based alloy coated steel sheets and an Al concentration $C_{Al}$ (% by mass) of the coating layer included in the each of the hot dip Zn-based alloy coated steel sheets satisfy the following expression (1):

$$0.0085W + 0.87 \leq C_{Al} \leq 22 \tag{1}$$

3. The method as set forth in claim 1, wherein the coating layer included in the each of the hot dip Zn-based alloy coated steel sheets further contains at least one selected from the group consisting of Mg, Ti, B, Si, and Fe, the coating layer containing the Mg at a concentration of 0.05% by mass to 10.0% by mass, the Ti at a concentration of 0.002% by mass to 0.10% by mass, the B at a concentration of 0.001% by mass to 0.05% by mass, the Si at a concentration of 0% by mass to 2.0% by mass, and/or the Fe at a concentration of 0% by mass to 2.5% by mass.

4. The method as set forth in claim 1, wherein the hot dip Zn-based alloy coated steel sheets are arc-welded so that:
- a number of spatters adhering to a region, which has a length of 100 mm and a width of 100 mm and in which a weld bead is middled, is not more than 20; and
- a blowhole occupancy Br, which is calculated from the following expression (2), is not more than 30%:

$$Br = (\Sigma d_i / L) \times 100 \qquad (2)$$

where:
di represents a length of the ith blowhole observed; and
L represents a length of the weld bead.

\* \* \* \* \*